United States Patent Office 3,732,329
Patented May 8, 1973

3,732,329
HYDROGENATION PROCESS UTILIZING
HOMOGENEOUS COPPER CATALYSTS
Judith G. Thatcher and William R. Deever, Richmond,
Va., assignors to Texaco Inc., New York, N.Y.
No Drawing. Filed Dec. 28, 1970, Ser. No. 102,166
Int. Cl. C07c 5/02, 11/02
U.S. Cl. 260—683.9                                    13 Claims

ABSTRACT OF THE DISCLOSURE

This invention relates to process for hydrogenating unsaturated organic molecules such as olefins and diolefins to their saturated derivatives utilizing homogeneous catalysts comprised of cuprous halides complexed with ligands containing organic radicals bonded to elements, in the trivalent state, selected from Group Va (excluding nitrogen and bismuth), particularly those of the phosphine and phosphite type.

This invention concerns processes for converting unsaturated organic molecules to their saturated derivatives using homogeneous copper complexes as the catalytic agents.

More particularly, this invention relates to processes for hydrogenating unsaturates such as olefins and diolefins using homogeneous catalysts comprised of cuprous halides complexed with ligands containing organic radicals bonded to one or more elements selected from Group Va of the Periodic Table (excluding nitrogen and bismuth).

Until comparatively recently, heterogeneous catalysts have mainly been used in the conversion of unsaturated organic molecules to their hydrogenated and isomerized derivatives. Typical of these catalysts are finely divided colloidal solids such as activated nickel, platinum, palladium and the like. These catalysts, in contrast to homogeneous catalysts, form phases separate from reactants and products and are usually insoluble in the reaction mixture. One of the characteristics which most heterogeneous catalysts share in common is a microporous structure and a very large internal surface area which can, in some instances, approach 1000 M.²/g. or more. Possibly because of the large surface areas involved, many of these catalysts are rather readily inactivated by diverse substances commonly known in the art as catalyst poisons. In view of this propensity, many heterogeneous catalysts suffer from the need for frequent replenishment and if economically feasible, for low-cost processes of regeneration. Other shortcomings of heterogeneous catalysts are that they usually require the use of rather elevated reaction temperatures and reaction pressures, and that they have relatively poor selectivity.

By selectivity, as defined herein, is meant the efficiency in catalyzing a desired conversion relative to other undesired reactions. In this instance isomerization or hydrogenation (reduction) are the desired conversions. Selectivity is usually expressed as a factor representing the amount of the isomer or saturate formed, divided by the amount of olefin in the starting material employed. Inasmuch as low selectivity and catalyst poisoning are costly and undesirable problems associated with catalysts, improved and alternative catalytic process which avoid or minimize these problems are continually being sought.

In view of these shortcomings, the literature has become replete with heretofore undisclosed classes of homogeneous metal complexes which are effective in converting many unsaturated organic molecules to their saturated products. These catalytic complexes are especially useful in the conversion of unsaturated hydrocarbons such as cyclic or linear olefins and diolefins to their desired conversion products. Not only do these catalysts exhibit a relatively high degree of selectivity, but they are comparatively resistant to loss of activity through poisoning, and are capable of achieving high conversions usually within a few hours of the initiation of the reaction. Unfortunately, most of the presently described homogeneous catalysts, while effective, comprise relatively rare and/or costly metals such as platinum, palladium, iridium, ruthenium and rhenium (coupled with Group Va elements) which are difficult to justify for industrial use. Recently, effective base metal homogeneous catalysts of one or more of the three transition metals of the cobalt-nickel-iron triad type, have been developed which are much less costly an function effectively under relatively mild conditions as hydrogenation and isomerization catalysts. Even more lately the present applicants have developed another class of relatively inexpensive homogeneous catalyst complexes which offer an alternative to the metal complexes of the iron triad group, particularly in the reduction of cyclic olefins. Like the latter catalysts, these catalyst complexes [1] function under relatively mild conditions of temperature and pressure and offer an alternative class of catalysts for reduction techniques.

In the practice, each mole [2] of unsaturated hydrocarbon substrate to be hydrogenated is contacted in an environment substantially free from carbon monoxide, water and oxidizing agents, with a catalytic amount of at least one cuprous halide molecule complexed with ligands comprising organic radicals bonded to elements, in the trivalent state, selected from Group Va of the Periodic Table [3] (excluding nitrogen and bismuth), such as phosphines, arsines, and phosphites and arsenites, in a solubilizing quantity of non-aqueous liquid inert solvent medium. The reaction is conducted at temperatures of at least 100° C. but below 250° C., at superatmospheric pressures ranging from about 300 to 1500 p.s.i.g. and higher, in a gaseous, pressurized environment provided by hy-

---

[1] "Complex" means a coordination compound formed by the union of one or more electronically rich molecules or atoms capable of independent existence with one or more electronically poor molecules or atoms, each of which is also capable of independent existence.
[2] Or any fractional parts or multiples thereof.
[3] As defined on page 54 of the 7th edition of Lange's Handbook of Chemistry.

drogen, until the desired saturated product is obtained. For some applications the products may be used in the form of the above reaction mixtures while for other purposes the products may be isolated and purified as described before.

In the preferred practice each mole of cyclic olefins containing from 3 to 20 carbon atoms is contacted with from 0.05 to 0.1 mole of cuprous chloride complexed with at least one ligand containing as its essential parts organic radicals selected from the group consisting of alkyls, aryls, aralkyls, alkaryls, cyclic alkyls, alkylated cyclic alkyls, and the oxy-, and in some cases trioxy-radicals derived from the above hydrocarbon radicals, bonded to trivalent phosphorous, in a nonaqueous reducing medium containing a solubilizing amount of inert solvent, said medium being substantially free from water, carbon monoxide and oxidizing agents, at temperatures ranging from 125°–175° C., at superatmospheric pressures provided by hydrogen pressurized between 400 to 600 p.s.i.g., until a substantial drop in pressure is observed and the desired saturated, hydrogenated product is produced. After cooling and bleeding off excess pressure, the saturated products contained therein are isolated and/or purified by standard procedures known in the art.

In order to aid in the full understanding of the inventive concept the following additional disclosure is submitted:

(A) Homogenous cuprous halide complex catalyst

In their active form these copper halide catalysts will contain copper atoms in the plus I valence state, complexed with a ligand whose complexing atom is an element of Group Va (excluding nitrogen and bismuth), in the trivalent state. Group Va elements particularly of interest include phosphorous and/or arsenic, to which are bonded organic radicals. The latter organic radicals comprise alkyls, aryls, aralkyls, alkaryls, cyclic alkyls, alkylated cyclic alkyls, and the corresponding oxy- and in some cases trioxy-radicals derived from the above hydrocarbons, said ligands being known as phosphines, phosphites, arsines, arsenites, and the less favored stibines and stibinites. The following complexing ligands are illustrative of these which may be employed; trimethylphosphine, triethylphosphine, tripropylphosphine, tri-n-butylphosphine, the triamylphosphines, the trihexylphosphines, tricyclohexylphosphine, dimethylphenylphosphine, diphenylethylphosphine, bis(diphenylphosphino)ethane, triphenylphosphine, the tritolylphosphines, the tri(methoxyphenylene)phosphines, as well as the corresponding arsines, phosphites and arsenites. Also illustrative of the ligands are the polycyclic esters such as 4-methyl-2,6,7-trioxa-1-phosphabicyclo[2.2.2]octane and 2,8,9-trioxa-1-phosphatricyclo-[3.3.1.1.$^{3,7}$]decane as well as the corresponding arsenic compounds.

The preferred homogeneous copper complexes are those of the type included within the structure:

CuClL wherein L is selected from the group consisting of alkylphosphines, alkylphosphites, arylphosphine, arylphosphites, alkylated phenylphosphines, alkylated phenylphosphites, wherein the aliphatic or alkyl groups vary between 1 and 12 carbon atoms, and saturated polycyclic phosphites. For reasons presently unclear, the addition of a cocatalyst such as $SnCl_2$ to the reaction mixture in the mole ratio of 1:1 to 10:1 $SnCl_2$ to cuprous chloride complex increases the rate of reduction and substantially increases selectivity of the catalyst complex.

The copper (I) complexes of this invention are known compounds and can be made by the reaction of anhydrous cuprous chloride with the ligand as typified by triphenylphosphite or triphenylphosphine, in inert solvents such as aromatics or higher boiling alkanes at elevated temperatures (usually at the refluxing temperature of the inert solvent). Ordinarily molar equivalents of cuprous chloride and the organic ligand are employed to produce the novel copper complexes.

(B) Unsaturated organic substrates

As defined herein, the substrates of this invention are unsaturated hydrocarbons of 3 or more carbon atoms containing one or more double and/or triple bonds linking one carbon atom to another. These substrates include both alpha and internal olefins, cyclic monoenes, linear and cyclic dienes and trienes. Illustrative unsaturates include alkenes such as 1-butene, 2-butene, 1-hexene, 2-hexene, cis-2-octene, as well as dienes such as 1,3-butadiene, 1,4-butadiene, 1,3-hexadiene, 2,4-hexadiene, 1,3-cyclohexadiene, 1,4-cyclohexadiene as well as their higher homologues among others.

The unsaturated substrates can be employed in the form of single, neat, discrete compounds or mixtures of these compounds. These unsaturates can contain substantial quantities of inert solvent such as the alkyl ethers, aromatics and alkanes.

(C) Reaction conditions required

General speaking, in order to consistently obtain high conversions of unsaturated organic substrates, particularly of olefins, certain reaction conditions are required. This combination of reaction conditions is referred to as a hydrogenation environment. "Hydrogenation environment" as used herein refers to the combination of conditions necessary to reduce the unsaturated organic substrate to the desired saturated product. This includes a dry, substantially oxygen-free and carbon monoxide-free medium and the appropriate pressurized gaseous hydrogen atmosphere required for the conversion desired. "Hydrogenation temperatures" as defined herein refer to those temperatures which range from the minimum temperature, about 100° C., required for the catalyst to show significant catalyst activity at a practical reaction rate, up to about 250° C. Freedom from carbon monoxide is necessary to avoid substantial formation of undesired carbonyl-containing products such as aldehydes and ketones. To assure this, the reactants, solvents, and reactor are flushed with hydrogen or an inert gas or gases before addition of the catalyst. Similarly, freedom from moisture and oxidizing agents such as oxygen or chloride, is necessary to minimize the catalytic complexes' instability under these conditions.

(1) Heating—As indicated previously, the reduction process proceeds at temperatures ranging from at least 100° C. up to but not exceeding 250° C. Inasmuch as the best yields are obtained between 135° and 150° C., these represent the preferred reaction temperatures.

(2) Reaction Pressure—Superatmospheric pressures are required for reasonable rates of reduction. Insofar as can be determined, pressures of at least 200 p.s.i.g. are required when operating within the prescribed reaction temperatures, with pressures ranging between 400 and 600 p.s.i.g. being preferred. Presumably pressures in excess of 600 p.s.i.g. may be employed, but since they appear to offer no concomitant advantage they are not ordinarily employed.

(3) Reaction times required for substantial reduction of unsaturated organic molecules is a variable dependent to some extent upon the unsaturated substrate to be reduced, the catalyst used, as well as the reaction temperatures and pressures, the batch size, etc. However, when the favored cuprous chloride phosphine and phosphite catalysts are used in the reduction of cyclic olefins at the favored temperatures and pressures, the reaction times can range from 12 hours and upwards, most usually from 8 to 36 hours.

(4) Mole ratio of olefin substrate to catalytic cuprous complex — Generally olefin-to-catalyst complex molar ratios in excess of 3:1 are operable. However, olefin-to-catalyst ratios of 5:1 to 50:1 are favored because of consistently better yields over a shorter reaction time. Inasmuch as the most consistently good results are obtained at molar ratios of 5:1 to 10:1, these represent the proposed ratios. Ordinarily, at least, the catalyst must be present in a quantity which is 20% by weight of olefin for reasonable reduction rates, and this is referred to as a catalytic amount.

(5) Solvents—Solvents, while not generally required, facilitate the case of handling and therefore are ordinarily employed. When solvents are utilized, they are usually present in quantities at least sufficient to dissolve the catalyst system, the olefin substrate and the optional $SnCl_2$ cocatalyst synergist. Suitable solvents are aromatics, chlorinated aliphatics, and mixtures of aromatics such as benzene, toluene, xylene with lower alkanols. The preferred solvents are benzene:ethanol mixtures (3:2 by volume) or methylene chloride used by itself.

(D) Method of utilizing the copper catalysts

Ordinarily a pressurizeable reactor, preferably glass or ceramic lined, equipped with heating, stirring and pressurizing means is first evacuated and then filled with hydrogen, nitrogen or another inert gas to remove oxidizing agents such as air. Most commonly, the catalyst system with or without the optional $SnCl_2$ cocatalyst synergist is added in the form of inert solvent solution such as benzene. Then the olefin, either neat or as a compatible solvent solution, is added and the reactor containing the entire reaction charge is flushed once again with hydrogen, nitrogen or another inert gas and pressurized to at least 200 p.s.i.g. with hydrogen. Then the reaction mixture is heated within the aforedescribed temperature limits while stirring. When the means used to monitor the progress of the reaction such as gas liquid partition chromatography (GLPC) indicates the reaction is substantially complete, or a substantial pressure drop takes place, the heating is terminated. At this time excess pressure is vented off and the contents removed to separate the saturated products contained therein. Mass spectrometry, infrared (IR) and nuclear magnetic resonance (NMR) spectrometry, and GLPC are among the analytical methods used to follow the conversion of the unsaturated substrates to their products.

Having described the inventive process in general terms, the following embodiments and examples are submitted to illustrate more specific aspects of the inventive concept. Unless otherwise stated, all parts and percentages are by weight rather than by volume, and all temperatures are ° C. rather than ° F.

Embodiment A—Preparation of the $CuClP(p-C_6H_4CH_3)_3$ Complex

Benzene (50 ml.) and anhydrous CuCl (0.73 g.) are heated to reflux in an appropriately sized reactor (100 ml.), equipped with heating, cooling and stirring means and capable of being flushed with a stream of inert gas. A 2.5 g. portion of tri-p-tolylphosphine, $P(p-C_6H_4CH_3)_3$, is added and the cuprous chloride dissolves, producing a clear, amber colored solution. After 16 hours of refluxing, the solution is filtered, reduced in volume under vacuum, and 30 ml. of n-pentane is added to the solution containing the product. A white crystalline solid separates out and is filtered and washed with 25 ml. of n-pentane to yield the product whose structure is confirmed by elemental analysis, melting point, and IR spectra.

Embodiments B to J—Preparation of various CuCl phosphite, arsenite, phosphine and arsine complexes In this procedure the catalytic cuprous chloride complexes shown below are prepared analogous to the manner described above using the designated ligand, and the molar ratios of Embodiment A in a refluxing inert solvent containing anhydrous cuprous chloride as in the preceding embodiment. The previously enumerated analytical methods are used to confirm that the desired complex is formed.

| Embodiment | Ligand | Complex |
| --- | --- | --- |
| B | $P(C_6H_5)_3$ | $CuClP(C_6H_5)_3$ |
| C | $As(C_6H_5)_3$ | $CuClAs(C_6H_5)_3$ |
| D | $P(OC_6H_5)_3$ | $CuClP(OC_6H_5)_3$ |
| E | $As(OC_6H_5)_3$ | $CuClAs(OC_6H_5)_3$ |
| F | $P(CH_2C_6H_5)_3$ | $CuClP(CH_2C_6H_5)_3$ |
| G | $[P(CH_2C_6H_5)_2]_2$ | $CuCl[P(CH_2C_6H_5)_2]_2$ |
| H | $As(p-C_6H_4CH_3)_3$ | $CuClAs(p-C_6H_4CH_3)_3$ |
| I | $P(OCH_2)_3CCH_3$ | $CuClP(OCH_2)_3CCH_3$ |
| J | $P(OCH_2)_3CC_2H_5$ | $CuClP(OCH_2)_3CC_2H_5$ |

EXAMPLE 1

Hydrogenation of a mixture of 1-hexene and 1,3-cyclohexadiene using $CuClP(p-C_6H_4CH_3)_3$ catalyst complex without $SnCl_2$ cocatalyst An appropriately sized reactor, fitted with means for heating, cooling, pressurizing and stirring, is charged with 0.4 g. (1 mM.) of $CuClP(p-C_6H_4CH_3)_3$ in 100 ml. of a 3:2 by volume benzene-ethanol solution and 1 ml. (8.0 mM.) of 1-hexene and 0.76 ml. (8.0 mM.) of 1,3-cyclohexadiene. The reactor is pressurized to 600 p.s.i.g. with hydrogen, then heated to 140° C. with stirring for 17 hours. At then end of this time, GLPC analysis showed 64.5% reduction of the cyclic diene to cyclohexene but no reduction of 1-hexene.

EXAMPLE 2

Repeat of hydrogenation of Example 1 except that $SnCl_2$ cocatalyst is employed The reactor of Example 1 is charged with the same concentration of $CuClP(p-C_6H_4CH_3)_3$ catalyst complex in the same solvent system and the same quantity and kind of mixed cyclic and alpha olefin, the sole difference being that prior to pressurizing to 600 p.s.i.g. with hydrogen, 0.57 g. (3 mM.) of $SnCl_2$ is incorporated into the stirred charge. After heating for 16 hours at 140° C. GLPC analysis showed 80% reduction of cyclic diene to 89% cyclohexene and 11% cyclohexane as well as 11.5% reduction of the 1-hexene to hexane. This example demonstrates the synergistic value of $SnCl_2$ as a cocatalyst.

EXAMPLES 3 TO 12

Hydrogenation of various olefins using the catalyst of Examples 1 and 2 with and without co-catalysts Other olefin reductions using the catalysts, apparatus and techniques of Examples 1 and 2 are summarized in Table I below. In all instances 1 mM. of the complex, $CuClP(p-C_6H_4CH_3)_3$, is used at 600 p.s.i.g. hydrogen pressure. All other reaction variables are given in the table.

As the preceding embodiments of this specification indicate, the novel homogeneous cuprous chloride complexes of this invention offer several advantages over the prior art. For instances, these catalysts are known compounds which can be synthesized using methods of the patent and technical literature. They offer a more economical alternative to the noble metal-containing homogeneous complexes previously reported, particularly when used for the reduction of olefins in the presence of cocatalysts,

TABLE I

| Example number | Co-catalyst, 3 mM. | Solvent | Ml. | Temp., °C. | Reaction time, hrs. | Substrate 1 Name | Substrate 1 No. mM. | Substrate 1 Percent conversion | Substrate 1 Product distribution | Substrate 2 Name | Substrate 2 No. mM. | Substrate 2 Percent conversion | Substrate 2 Product distribution |
|---|---|---|---|---|---|---|---|---|---|---|---|---|---|
| 1 | .......... | Benzene | 100 | 150 | 22 | 1,2-octene | 8.0 | 0 | .......... | 1,3-cyclohexadiene | 8.0 | 37 | 100% cyclohexene. |
| 2 | (C₆H₅)₃N | {Benzene / Benzene} | {60 / 40} | 150 | 23 | 1-hexene | 8.0 | 7.7 | 100% hexane | do | 8.0 | 16.4 | {21.9% cyclohexene / 78.1% cyclohexane.} |
| 3 | (C₆H₅)₃N | {Benzene / Ethanol} | {100 / 60} | 150 | 19 | do | 8.0 | 0 | .......... | do | 8.0 | 0 | .......... |
| 4 | SnCl₂ | {Benzene / Ethanol} | {60 / 40} | 150 | 16 | do | 8.0 | 11.5 | 100% hexane | do | 8.0 | 80 | {11% cyclohexene / 89% cyclohexane.} |
| 5 | SnCl₂ | {Benzene / Ethanol} | {60 / 40} | 135 | 17 | do | 8.0 | 0 | .......... | do | 8.0 | 64.5 | {100% cyclohexene / 12.5% cyclohexene.} |
| 6 | SnCl₂ | {CH₂Cl₂ / Ethanol} | {100 / 02} | 140 | 18 | do | 8.0 | 45 | 100% hexane | do | 8.0 | 96.5 | {87.5% cyclohexene.} |
| 7 | SnCl₂ | CH₂Cl₂ | 100 | 140 | 13 | do | 8.0 | 23 | do | do | 8.0 | 100 | {97% cyclohexene / 3% cyclohexane.} |
| 8 | SnCl₂ | CH₂Cl₂ | 200 | 120 | 20 | 2,4-hexadiene | 31.5 | Slight | 100% hexenes | 1,7-octadiene | 14.0 | Slight | 100% octenes. |
| 9 | .......... | {Benzene / Ethanol} | {60 / 40} | 135 | 24 | do | 17.6 | 85 | do | do | 8.0 | 45 | Do. |
| 10 | SnCl₂ | {Benzene / Ethanol} | {60 / 40} | 135 | 22 | do | 31.5 | 29 | do | .......... | .......... | .......... | .......... |
| 11 | SnCl₂ | {Benzene / Ethanol} | {60 / 40} | 135 | 7 | 1,7-octadiene | 14 | 0 | .......... | .......... | .......... | .......... | .......... | especially SnCl₂. Additional advantages are moderate rates of reduction and selectivities ranging from fairly good to good.

Also, as indicated above, various substitutions, changes and modifications may be made without departing from the inventive concept. For example, the preferred cuprous chloride may be complexed with various organic-containing phosphorus and arsenic ligands. The metes and bounds of this invention may best be determined by a perusal of the claims which follow, read in conjunction with the preceding specification.

What is claimed is:

1. A process for hydrogenating olefinic hydrocarbons selected from the group consisting of alpha olefins, internal olefins and cyclic monoenes containing 3 or more carbon atoms, linear dienes and cyclic dienes containing 6 to 8 carbon atoms, comprising the steps of:

(a) contacting said olefinic hydrocarbon to be hydrogenated with at least 20% of its weight of cuprous chloride complex catalyst, said cuprous chloride being complexed with a molar equivalent of a ligand whose complexing atom is selected from the group consisting of phosphorous and arsenic, to which are bonded organic radicals selected from the group consisting of alkyls, aryls, aralkyls, cyclic alkyls, alkylated cyclic alkyls, in a solubilizing quantity of dry, liquid, inert solvent and inert gaseous medium, to form a reaction mixture, (b) heating said reaction mixture to a temperature of at least 100° C. but not exceeding 250° C., in the presence of a pressurized, dry hydrogen atmosphere kept at a pressure of at least 200 p.s.i.g., until hydrogenation takes place.

2. The process of claim 1 wherein the Group Va element is phosphorous in a form selected from the group consisting of phosphite and phosphine.

3. The process of claim 2 wherein the reaction is conducted in the presence of inert solvent and in the presence of SnCl₂ cocatalyst, said mole ratio of SnCl₂ to cuprous chloride complex ranging from 1:1 to 10:1.

4. The process of claim 3 wherein the solvent is an aromatic-alkanol mixture.

5. A process for hydrogenating unsaturated hydrocarbon molecules selected from the group consisting of alpha olefins, internal olefins, cyclic monoenes, linear dienes, cyclic dienes and cyclic trienes, containing 6 to 8 carbon atoms, comprising the steps of:

(a) contacting each mole of said molecules to be hydrogenated with from 0.05 to 0.1 mole of cuprous chloride complexed with at least one ligand containing as its essential parts organic radicals selected from the group consisting of aryls, alkaryls, alkyls, and cyclic alkyls, bonded to a phosphite or phosphine moiety and, from 0.1 to 0.5 moles of SnCl₂ in a nonaqueous, inert solvent environment, substantially free from oxidizing agents and carbon monoxide to form a reaction mixture, and (b) heating said reaction mixture between temperatures ranging from 135° C. to 150° C., in the presence of superatmospheric pressures ranging from 400 p.s.i.g. to 600 p.s.i.g., until hydrogenation takes place.

6. The process of claim 5 wherein the element is phosphorous in the phosphine form.

7. The process of claim 5 wherein the element is phosphorous in the phosphite form.

8. The process of claim 6 wherein the cuprous chloride catalyst is CuClP(OCH₂)₃CCH₂CH₃.

9. The process of claim 6 wherein the cuprous chloride catalyst is CuClP(p-C₆H₄CH₃)₃.

10. The process of claim 9 wherein the unsaturated hydrocarbon molecule is an alpha olefin.

11. The process of claim 9 wherein the unsaturated hydrocarbon molecule is an internal olefin.

12. The process of claim 9 wherein the unsaturated hydrocarbon molecule is a diene of the linear type.

13. The process of claim 12 wherein the diene is of the cyclic type.

References Cited

UNITED STATES PATENTS

| | | | |
|---|---|---|---|
| 3,076,858 | 2/1963 | Frevel et al. | 260—677 H |
| 3,128,317 | 4/1964 | Arkell et al. | 260—677 H |
| 3,297,776 | 1/1967 | Reich | 260—677 H |
| 3,450,783 | 6/1969 | Merryfield et al. | 208—143 |
| 3,591,656 | 6/1971 | Kroll | 260—683.9 |

OTHER REFERENCES

Booth, Advances in Inorganic and Radio Chemistry, Academic Press, N.Y., N.Y., vol. 6, 1964, pp. 47–49.

DANIEL E. WYMAN, Primary Examiner

A. P. DEMERS, Assistant Examiner

U.S. Cl. X.R.

252—429 B; 260—438.1, 677 H